United States Patent
Lee et al.

(10) Patent No.: US 11,776,365 B1
(45) Date of Patent: Oct. 3, 2023

(54) KITS, METHODS AND PROGRAMS FOR GENERATING DISTRESS SIGNALS BASED ON SOLAR ENERGY

(71) Applicant: BASE AND POWER CITY Corp., Seoul (KR)

(72) Inventors: Donguk Lee, Seoul (KR); Yangho Shin, Seoul (KR); Sung Soo Park, Seoul (KR)

(73) Assignee: BASE AND POWER CITY Corp., Seoul (KR)

( * ) Notice: Subject to any disclaimer, the term of this patent is extended or adjusted under 35 U.S.C. 154(b) by 0 days.

(21) Appl. No.: 18/308,193

(22) Filed: Apr. 27, 2023

(30) Foreign Application Priority Data

May 2, 2022 (KR) .......................... 10-2022-0054255

(51) Int. Cl.
  *G08B 5/00* (2006.01)
  *F21S 9/03* (2006.01)
  (Continued)

(52) U.S. Cl.
  CPC .............. *G08B 5/002* (2013.01); *F21S 9/035* (2013.01); *F21V 21/26* (2013.01); *H02S 20/30* (2014.12); *F21Y 2115/10* (2016.08)

(58) Field of Classification Search
  CPC .......... G08B 5/002; F21S 9/035; F21V 21/26; F21Y 2115/10; H02S 20/30
  See application file for complete search history.

(56) References Cited

U.S. PATENT DOCUMENTS 8,203,237 B1 * 6/2012 Cowles ................. H02S 20/30
                                                                307/150
8,592,672 B2    11/2013 Chu
(Continued)

FOREIGN PATENT DOCUMENTS

| JP | 3175248 U | 4/2012 |
| KR | 10-2014-0013135 A | 2/2014 |
| KR | 10-2017-0021495 A | 2/2017 |

OTHER PUBLICATIONS

Notice of Result of Preliminary Examination of Korean Application No. 10-2022-0054255 dated Jun. 3, 2022.
Notice of Allowance of Korean Application No. 10-2022-0054255 dated Dec. 14, 2022.

*Primary Examiner* — Ojiako K Nwugo
(74) *Attorney, Agent, or Firm* — Sughrue Mion, PLLC (57) ABSTRACT

According to embodiments of the present invention, a kit for generating a distress signal based on solar energy is disclosed. This kit comprises: a base unit that includes a base plate, a long-distance communication module coupled to one side of the base plate, at least one processor, and a battery; and a plurality of arm units that are spaced from one another and arranged around the periphery of the base plate, and are connected to the base plate through a first hinge, wherein each arm unit includes: a first arm plate that is connected to the base plate at one end thereof through the first hinge, and can rotate around a folded portion of the first hinge as a rotation axis in a clockwise or counter-clockwise direction; a first solar module and a first light emitting module, which are attached to one side of the first arm plate facing the rotation direction in a clockwise direction; a second arm plate that is connected to the other end opposite to the one end of the first arm plate through a second hinge, and can rotate around a folded portion of the second hinge as a rotation axis in a clockwise or counter-clockwise direction; and a second solar module and a second light (Continued)

emitting module, which are attached to one side of the second arm plate facing the rotation direction in a counter-clockwise direction, wherein the at least one processor controls the first solar module and the second solar module to generate electric energy using the received light energy, and then to store the generated electric energy in the battery, and also can control the first light emitting module and the second light emitting module to emit light using the electric energy stored in the battery.

3 Claims, 8 Drawing Sheets

(51) Int. Cl.
*H02S 20/30* (2014.01)
*F21V 21/26* (2006.01)
*F21Y 115/10* (2016.01)

(56) References Cited

U.S. PATENT DOCUMENTS

| | | | |
|---|---|---|---|
| 2009/0196033 A1* | 8/2009 | Macdonald | F21L 14/00 |
| | | | 362/249.05 |
| 2015/0061874 A1* | 3/2015 | Kim | A42B 3/285 |
| | | | 362/106 |
| 2015/0200318 A1* | 7/2015 | Thiel | H01L 31/048 |
| | | | 116/2 |
| 2016/0229512 A1* | 8/2016 | Hall | G08B 5/002 |
| 2016/0272287 A1* | 9/2016 | Covelli | G01S 19/17 |
| 2016/0353560 A1* | 12/2016 | Bortolotti | H04W 4/023 |
| 2020/0327783 A1* | 10/2020 | Moore | G08B 7/06 |
| 2022/0057528 A1* | 2/2022 | Bennett | G01S 19/14 |
| 2022/0194529 A1* | 6/2022 | Covelli | G08B 5/002 |
| 2023/0023110 A1* | 1/2023 | Suntych | A61M 21/00 |

* cited by examiner

KITS, METHODS AND PROGRAMS FOR GENERATING DISTRESS SIGNALS BASED ON SOLAR ENERGY

CROSS-REFERENCE TO RELATED APPLICATION

This application claims priority to Korean Patent Application No. 10-2022-0054255, filed on May 2, 2022, in the Korean Intellectual Property Office, the disclosure of which is incorporated herein by reference.

Field of Invention

The present invention relates to kits, methods and programs for generating distress signals based on solar energy.

Background of Invention

Unless otherwise indicated herein, the contents described in this section are not prior art in relation to the claims of this application, and inclusion in this section is not an admission that it is prior art.

As global warming accelerates, diverse types of climate disasters are occurring. In particular, the number of climate refugees due to different types of climate disasters, such as fires caused by spontaneous combustion and floods caused by rising water levels, is also increasing.

In the event of a large-scale climate disaster, power supply facilities or communication facilities are damaged, and climate refugees cannot request a rescue signal or rescuers cannot identify the location of climate refugees. Therefore, importance of technology that can rescue climate refugees when damaged power supply facilities or communication facilities are emerging.

Summary of Invention

Technical Problem to be Solved

One object of the present invention is to provide a kit, method and program for generating a distress signal based on solar energy, which can generate electrical energy using light energy to thus send a distress signal and generate a light emitting signal using the generated electrical energy.

Another object of the present invention is to provide a kit for generating a distress signal based on solar energy, in which components constituting the kit are connected in a foldable and un-foldable structure, as well as a method and program for generating a distress signal using the above kit.

Technical Solution

One aspect of the present invention for achieving the above objects is to provide a kit for generating a distress signal based on solar energy.

Further, the kit may include: a base unit that includes a base plate, a long-distance communication module coupled to one side of the base plate, at least one processor, and a battery; and a plurality of arm units that are spaced apart from one another along the periphery of the base plate and are connected to the base plate through a first hinge.

Further, each of the arm units may include: a first arm plate that is connected to the base plate at one end thereof through the first hinge, and can rotate around a folded portion of the first hinge as a rotation axis in a clockwise or counter-clockwise direction; a first solar module and a first light emitting module, which are attached to one side of the first arm plate facing the rotation direction in a clockwise direction; a second arm plate that is connected to the other end opposite to the one end of the first arm plate through a second hinge, and can rotate around a folded portion of the second hinge as a rotation axis in a clockwise or counter-clockwise direction; and a second solar module and a second light emitting module, which are attached to one side of the second arm plate facing the rotation direction in a counter-clockwise direction.

Further, the at least one processor may control the first solar module and the second solar module to generate electrical energy using received light energy and to store the generated electrical energy in the battery, and may also control the first light emitting module and the second light emitting module to emit light using the electric energy stored in the battery.

Further, the first hinge may be configured to be folded or unfolded between a preset first maximum angle and a preset first minimum angle, while the second hinge may be configured to be folded or unfolded between a preset second maximum angle and a preset second minimum angle.

Further, the at least one processor may control the long-distance communication module to send a distress signal when the kit is in a first state, wherein the first state may be a state in which the first hinge is unfolded at the first maximum angle and thus the first arm plate extends in a radial direction of the base plate, while the second hinge is unfolded at an angle between the second maximum angle and the second minimum angle and thus the second arm plate rotates in a counter-clockwise direction to a folded portion of the second hinge as a rotation axis.

Further, as the first hinge and the second hinge are folded, the kit may be switched to a second state, wherein the second state may be a state in which the second hinge is folded at the second minimum angle and thus the other side opposite to the one side of the first arm plate and the other side opposite to the one side of the second arm plate are faced in contact with each other, while the first hinge is folded at the first minimum angle and thus the arm units are extending in a direction away from the one side of the base plate.

In addition, at least one ring may be formed to protrude from the other side opposite to the one side of the base plate.

Effect of Invention

According to an embodiment of the present invention, electrical energy may be generated using light energy, a distress signal may be sent and a light emitting signal may be generated using the generated electrical energy. This allows a distress signal to be sent while generating a light emitting signal by means of a kit even when a nearby power supply facility or communication facility is damaged.

Further, according to the present invention, components constituting the kit are connected in such a structure that can be folded and unfolded, whereby the components constituting the kit may be folded and carried in a form with minimum volume. Further, when using the kit, it is possible to send a distress signal and generate a light emitting signal after unfolding the components of the kit and controlling the kit into a form suitable for sending the distress signal.

DETAILED ESCRIPTION OF PREFERRED EMBODIMENTS OF NVENTION

Since the present invention may include addition of diverse alterations and also have various embodiments, specific embodiments will be illustrated in the drawings and described in detail in the detailed description. However, this is not intended to limit the present invention to specific embodiments, but should be understood to include all modifications, equivalents, substitutes included in the spirit and scope of the present invention. Like reference numerals have been used for like elements throughout the description of each figure.

Terms such as first, second, A, and B may be used to describe various components, but the components should not be limited by the terms. These terms are only used for the purpose of distinguishing one component from another. For example, a first element may be termed a second element, and similarly, a second element may be termed a first element, without departing from the scope of the present invention. The terms "and/or" may include any combination of a plurality of related recited items or any of the plurality of related recited items.

It should be understood that, when an element is referred to as being "coupled" or "connected" to another element, it may be directly coupled or connected to the other element and other elements may also exist therebetween. On the other hand, when an element is referred to as "directly coupled" or "directly connected" to another element, it should be understood that no other element exists therebetween.

The terms "upper side", "lower side", "left side", "right side", "front side" and "rear side" used in the following description will be understood with reference to the coordinate system shown throughout the accompanying drawings.

Terms used in this application are only used to describe specific embodiments, and are not intended to limit the present invention. Singular expressions include plural expressions unless the context clearly dictates otherwise. In this application, the terms "include" or "have" are intended to designate that a feature, number, step, operation, component, part, or combination thereof described in the specification is present, but it should be understood that the presence or addition of other features, numbers, steps, operations, components, parts, or combinations thereof is not precluded.

Unless defined otherwise, all terms used herein including technical or scientific terms have the same meaning as commonly understood by one of ordinary skill in the art to which the present invention belongs. Terms such as those defined in commonly used dictionaries should be interpreted as having the meanings consistent with the meanings in the context of the related art. Further, unless explicitly defined in the present application, the above terms should not be interpreted in an ideal or excessively formal meaning.

Hereinafter, preferred embodiments according to the present invention will be described in detail with reference to the accompanying drawings.

Figure 1:
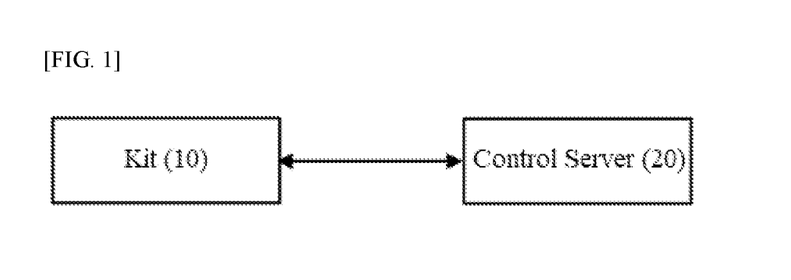
FIG. 1 is a schematic diagram of a system for transmitting and receiving a distress signal according to an embodiment of the present invention.

FIG. 1 is a schematic diagram of a system for transmitting and receiving a distress signal according to an embodiment of the present invention.

The system for transmitting and receiving a distress signal according to an embodiment of the present invention may include a kit 10 and a control server 20. The kit 10 may transmit a distress signal to the control server 20, and the control server 20 may receive the distress signal and acquire a location of the kit 10 and a distress type included in the distress signal. Through this, personnel who control the control server 20 can check the distress signal and take appropriate measures.

Figure 2:
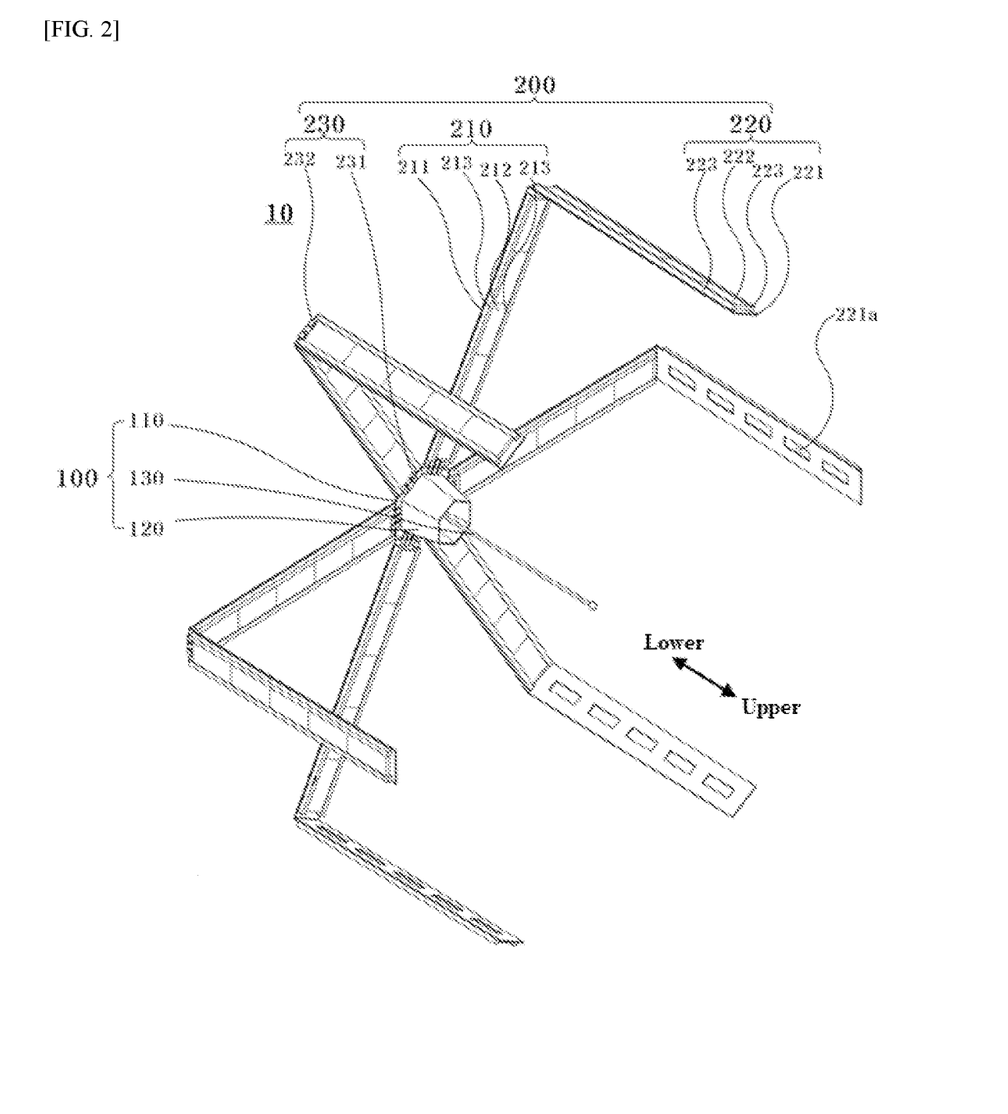
FIG. 2 is a perspective view illustrating a kit in an unfolded state according to an embodiment of the present invention.
Figure 3:
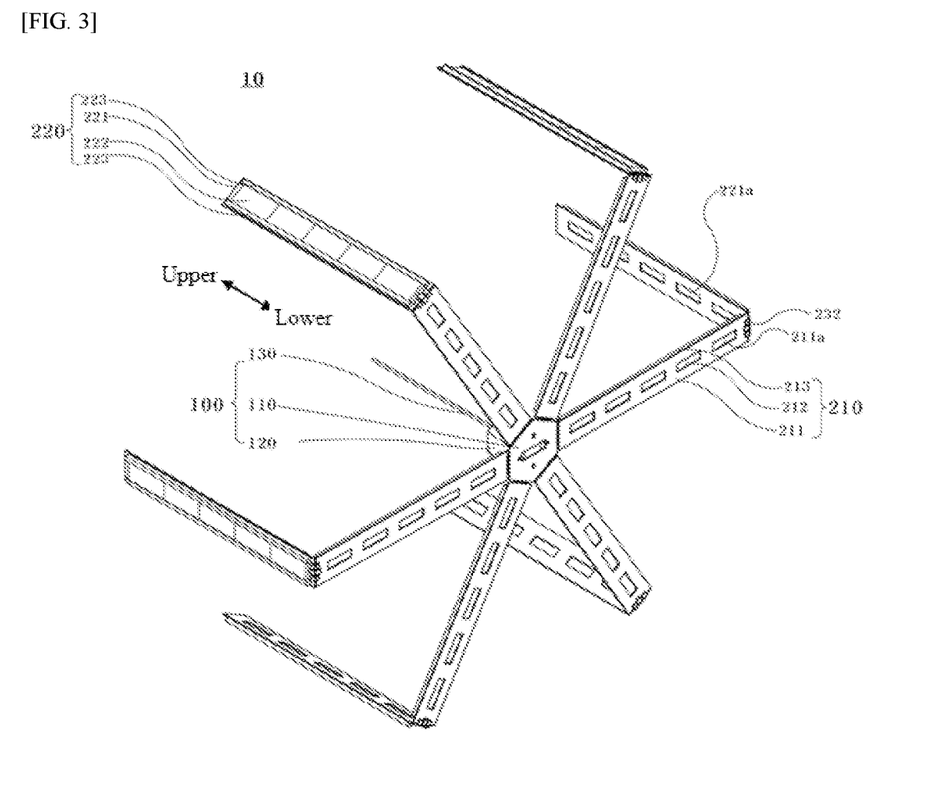
FIG. 3 is a perspective view illustrating a kit in an unfolded state according to another embodiment of the present invention.

FIGS. 2 and 3 are perspective views illustrating the kit 10 in an unfolded state according to an embodiment of the present invention.

The kit 10 may include a base unit 100 and a plurality of arm units 200 connected to the base unit 100.

The base unit 100 may include a base plate 110, a case 120 and a long-distance communication module 130.

A plurality of arm units 200 may be disposed to be spaced apart from each other along the circumferential direction around the base plate 110, wherein an end of each of the plurality of arm units 200 facing the base plate 110 is connected to the base plate 110. In one embodiment, the base plate 110 may be formed in a plate shape having the same number of lateral surfaces as the number of the plurality of arm units 200. For instance, when the number of the plurality of arm units 200 is six (6), the base plate 110 may be formed in a hexagonal plate shape, but is not limited thereto.

Each of the plurality of arm units 200 and the base plate 110 may be connected by a first hinge 231. In one embodiment, a plurality of first hinges 231 may be used to connect one arm unit 200 and the base plate 110. In one embodiment, the first hinge 231 consists of two members connected to each other to be folded or unfolded. As a structure in which two members can be folded or unfolded relative to each other, different known structures may be used. One of the two members constituting the first hinge 231 is coupled to the arm unit 200 while the other is coupled to the base plate 110. Through this, any one point included in the arm unit 200 may be rotated in a direction in which the first hinge 231 is folded or unfolded while centering around the folded portion of the first hinge 231. In one embodiment, the first hinge 231 may be folded or unfolded such that the two members form an angle between 0° and 180° to each other.

As the first hinge 231 is folded, the arm unit 200 may be rotated based on the folded portion of the first hinge 231. In one embodiment, the arm unit 200 may rotate from a state parallel to the upper surface of the base plate 110 to a state perpendicular to the upper surface of the base plate 110 with reference to the folded portion of the first hinge 231, but is not limited thereto. In one embodiment, in a state in which the first hinge 231 is fully unfolded, the base plate 110 and the arm unit 200 may be disposed in parallel with each other. In one embodiment, in a state in which the first hinge 231 is maximally folded, the base plate 110 and the arm portion 200 may be disposed perpendicular to each other, but are not limited thereto. The first hinge 231 may be folded until the arm unit 200 contacts the outer surface of the case 120 and is then supported. In one embodiment, the arm unit 200 may rotate counter-clockwise until the angle between the base plate 110 and the arm unit 200 reaches a preset maximum angle while the base plate 110 is fixed. In one embodiment, the arm unit 200 may rotate clockwise until the angle between the base plate 110 and the arm unit 200 becomes a preset minimum angle while base plate 110 is fixed. In one embodiment, the preset maximum angle is 180°, while the preset minimum angle may be an angle formed by the arm unit 200 and the base plate 110 at a time when the arm unit 200 and the outer surface of the case 120 are in contact with each other and then supported.

As the first hinge 231 is folded, the arm unit 200 may rotate clockwise or counter-clockwise based on the folded portion of the first hinge 231. That is, the arm unit 200 may rotate clockwise or counter-clockwise while the base plate 110 is fixed.

The case 120 is coupled to the upper surface of the base plate 110 and forms an internal space open upward along with the upper surface of the base plate 110. In the inner space of the case 120, a short-range communication module 140, a processor 150, a battery 160, and a GPS module 170 may be disposed.

The long-distance communication module 130 is coupled to the upper surface of the base plate 110 and extends upward in a columnar shape. A communication signal may be amplified through the long-distance communication module 130.

The arm unit 200 may include a first arm 210 and a second arm 220 connected to each other.

The first arm 210 is connected to the base plate 110 by a first hinge 231, while the second arm 220 is connected to the first arm 220 by a second hinge 232. In one embodiment, the second hinge 232 may consist of two members connected to each other to be folded or unfolded. As a structure in which two members can be bent or stretched (that is, folded or unfolded) relative to each other, a variety of known structures may be used. One of the two members constituting the second hinge 231 is coupled to the first arm 210 and the other is coupled to the second arm 220. Hence, any one point included in the second arm 220 may be rotated in a direction in which the second hinge 232 is folded or unfolded while centering around the folded portion of the second hinge 232. In one embodiment, the second hinge 232 may be folded or unfolded such that the two members form an angle between 0° and 180° to each other.

In one embodiment, a plurality of second hinges 232 may be used to connect the first arm 210 and the second arm 220.

As the second hinge 232 is folded, the second arm 220 may rotate based on the folded portion of the second hinge 232. In one embodiment, the second arm 220 may rotate from a state parallel to the upper surface of the first arm 210 to a state perpendicular to the upper surface of the first arm 210, with reference to the folded portion of the second hinge 232, but is not limited thereto. In one embodiment, in a state in which the second hinge 232 is fully unfolded, the first arm 210 and the second arm 220 may be disposed in parallel with each other. In one embodiment, as the second hinge 232 is folded, the first arm 210 and the second arm 220 may be disposed perpendicular to each other. Further, in a state in which the second hinge 232 is maximally folded, one side of the second arm 220 may come into contact with the first light emitting module 213 disposed on the upper surface of the first arm 210.

As the second hinge 232 is folded, the second arm 220 may rotate clockwise or counter-clockwise based on the folded portion of the second hinge 232. That is, the second arm 220 may rotate clockwise or counter-clockwise while the first arm 210 is fixed. In one embodiment, the second arm 220 may rotate counter-clockwise until the angle between the first arm 210 and the second arm 220 reaches a preset maximum angle while the first arm 210 is fixed. In one embodiment, the second arm 220 may rotate clockwise until the angle formed by the first arm 210 and the second arm 220 reaches a preset minimum angle while the first arm 210 is fixed. In one embodiment, the preset maximum angle may be 180° and the preset minimum angle may be 0°.

With both the first hinge 231 and the second hinge 232 fully extended, the first arm 210 and the second arm 220 may extend in the radial direction of the base plate 110.

In a state in which all of the first hinges 231 are fully unfolded, the first arms 210 connected to the base plate 110 may be positioned parallel to the base plate 110. Therefore, the kit 10 can be stably supported by the lower surface of the base plate 110 and the lower surfaces of the first arms 210.

Further, in a state in which all of the second hinges 232 are half-opened, the second arms 220 extend upward.

As shown in FIGS. 2 and 3, the user can operate the kit 10 to lead to a first state such that the first arms 210 are disposed parallel to the base plate 110 while the second arms 220 are arranged to extend upward at a predetermined angle with the first arms 210. Further, in the first state, the kit 10 may send a distress signal.

The first arm 210 may include a first arm plate 211, a first solar panel 212 and a first light emitting module 213.

The first arm plate 211 is directly connected to the base plate 110 through the first hinge 231. In one embodiment, the first arm plate 211 may be formed in a rectangular plate shape, but is not limited thereto.

A first through hole 211a is formed through the first arm plate 211. In one embodiment, a plurality of first through holes 211a may be formed. The plurality of first through holes 211a may be spaced apart from one another along the extending direction of the first arm plate 211. The first through hole 211a may be formed in a rectangular shape, but is not limited thereto, and may be formed in diverse shapes. As the plurality of first through holes 211a are formed, the overall weight of the kit 10 is reduced so that the portability of the kit 10 can be improved.

In one embodiment, when a direction in which the first arm plate 211 extends is referred to as a first direction (or referred to as a length direction), and a direction crossing the extended direction is defined as a second direction (or referred to as a width direction), the first through hole 211a may be disposed at the center of the first arm plate 211 in the second direction.

A first solar panel 212 and a first light emitting module 213 may be attached to one side of the first arm plate 211. In one embodiment, one side of the first arm plate 211 to which the first solar panel 212 and the first light emitting module 213 are attached may be a surface facing a direction in which the first arm plate 211 rotates clockwise.

The first solar panel 212 may be configured to generate electrical energy using light energy incident on the first solar panel 212. Electrical energy generated by the first solar panel 212 may be stored in the battery 160 of the base unit 100. The first solar panel 212 and the battery 160 may be electrically connected to each other.

In one embodiment, the first solar panel 212 may extend along the extending direction of the first arm plate 211. Further, in one embodiment, a plurality of first solar panels 212 may be provided, and the plurality of first solar panels 212 may be sequentially arranged along the extending direction of the first arm plate 211.

The first light emitting module 213 may be configured to emit light by receiving electric energy from the battery 160. The first light emitting module 213 and the battery 160 may be electrically connected to each other. In one embodiment, the first light emitting module 213 may be a light emitting diode (LED) module. In one embodiment, the first light emitting module 213 may consist of a plurality of LED modules. A plurality of LED modules may be sequentially arranged along the extending direction of the first arm plate 211. In one embodiment, two of the first light emitting modules 213 may be provided, and each of the two first light emitting modules 213 may be disposed on both sides of the solar panel 213 in a direction crossing the direction in which the first arm plate 211 extends.

The second arm 220 may include a second arm plate 221, a second solar panel 222 and a second light emitting module 223.

The second arm plate 221 is directly connected to the first arm plate 211 through a second hinge 232. In one embodiment, the second arm plate 221 may be formed in a rectangular plate shape, but is not limited thereto.

A second through hole 221a is formed through the second arm plate 221. In one embodiment, the second through hole 221a may be formed in plurality. The plurality of second through holes 221a may be spaced apart from one another along the extending direction of the second arm plate 221. The second through hole 221a may be formed in a rectangular shape, but is not limited thereto, and may be formed in diverse shapes. As the plurality of second through holes 221a are formed, the overall weight of the kit 10 is reduced so that the portability of the kit 10 can be improved.

In one embodiment, when a direction in which the second arm plate 221 extends is referred to as a first direction (or referred to as a length direction), and a direction crossing the extended direction may be defined as a second direction (or referred to as a width direction), the second through hole 221a may be disposed at the center of the second arm plate 221 in the second direction.

A second solar panel 222 and a second light emitting module 223 may be attached to one side of the second arm plate 221. In one embodiment, one side of the second arm plate 221 to which the second solar panel 222 and the second light emitting module 223 are attached may be a surface facing a direction in which the second arm plate 221 rotates counter-clockwise. In an embodiment not shown, one side of the second arm plate 221 to which the second solar panel 222 and the second light emitting module 223 are attached may be a surface facing a direction in which the second arm plate 221 rotates clockwise.

The second solar panel 222 may be configured to generate electrical energy using light energy incident on the second solar panel 222. Electrical energy generated by the second solar panel 222 may be stored in the battery 160 of the base unit 100. The second solar panel 222 and the battery 160 may be electrically connected to each other.

In one embodiment, the second solar panel 222 may extend along the extending direction of the second arm plate 221. Further, in one embodiment, the second solar panel 222 may be provided in plurality, and the plurality of second solar panels 222 may be sequentially arranged along the extending direction of the second arm plate 221.

The second light emitting module 223 may be configured to emit light by receiving electric energy from the battery 160. The second light emitting module 223 and the battery 160 may be electrically connected to each other. In one embodiment, the second light emitting module 223 may be a light emitting diode (LED) module. In one embodiment, the second light emitting module 223 may consist of a plurality of LED modules. A plurality of LED modules may be sequentially arranged along the extending direction of the second arm plate 221. In one embodiment, two second light emitting modules 223 may be provided, and each of the two second light emitting modules 223 may be disposed on both sides of the solar panel 223 in a direction crossing the direction in which the second arm plate 221 extends.

Figure 4:
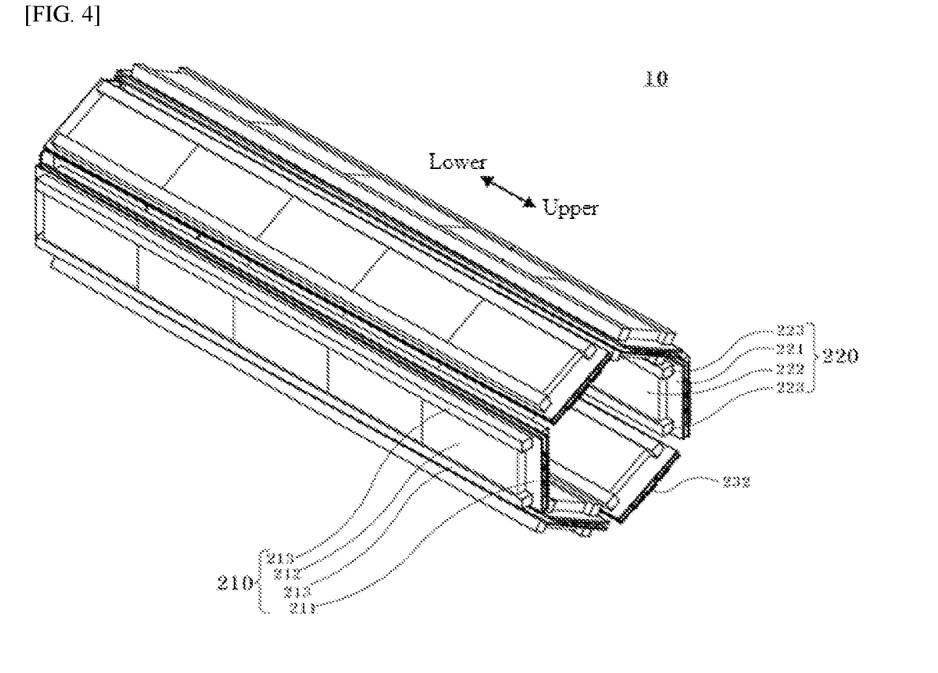
FIG. 4 is a perspective view illustrating a kit in a folded state according to an embodiment of the present invention.
Figure 5:
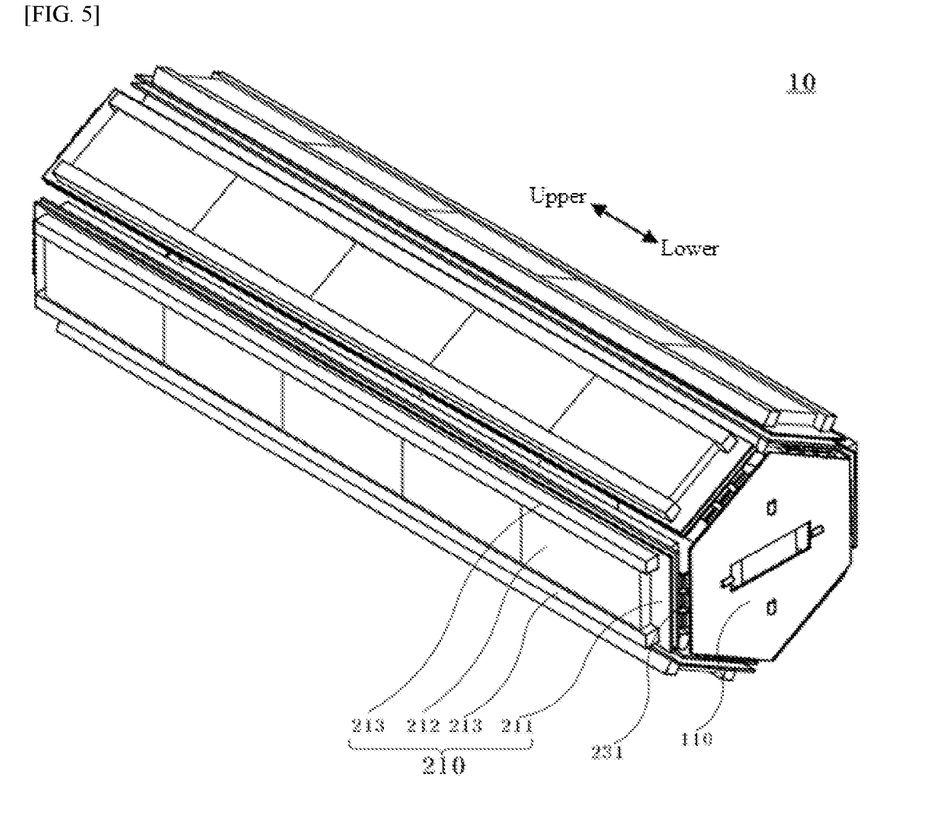
FIG. 5 is a perspective view illustrating a kit in a folded state according to another embodiment of the present invention.

FIGS. 4 and 5 are perspective views illustrating a folded state of the kit 10 according to an embodiment of the present invention.

Referring to FIGS. 4 and 5, the kit 10 in a second state in which a user can easily carry the kit 10 is shown. The second state means a state in which both the first hinge 231 and the second hinge 232 of the kit 10 are maximally folded.

First, as the second hinge 232 is folded, the second arm plate 221 is rotated clockwise around the folded portion of the second hinge 232 as a rotation axis. In one embodiment, in a state in which the second hinge 232 is maximally folded, the second arm plate 221 and the first arm plate 211 may be arranged parallel to each other. In one embodiment, in a state in which the second hinge 232 is maximally folded, the other side of the second arm plate 221 opposite to the one side where the second solar panel 223 is disposed, and the other side of the first arm plate 211 opposite to the one side where the first solar panel 213 is disposed, may be in contact with each other while facing each other.

Further, in a state where the second hinge 232 is maximally folded, as the first hinge 231 is folded, the first arm plate 211 rotates clockwise around the folded portion of the first hinge 231 as a rotation axis. In one embodiment, in a state in which the first hinge 231 is maximally folded, the first arm plate 211 and the base plate 110 may be arranged perpendicular to each other. In one embodiment, in a state in which the second hinge 232 is maximally folded, the first arm plate 211 and the second arm plate 221 may extend upward.

A structure that can be connected to the user's clothing may be formed on the lower surface of the base plate 110. In the illustrated embodiment, a plurality of rings through which strings can pass may be formed on the lower surface of the base plate 110. The user can easily carry the kit 10 in the second state by passing a string through the rings and connecting the passed string to the user's clothing or the like.

Figure 6:
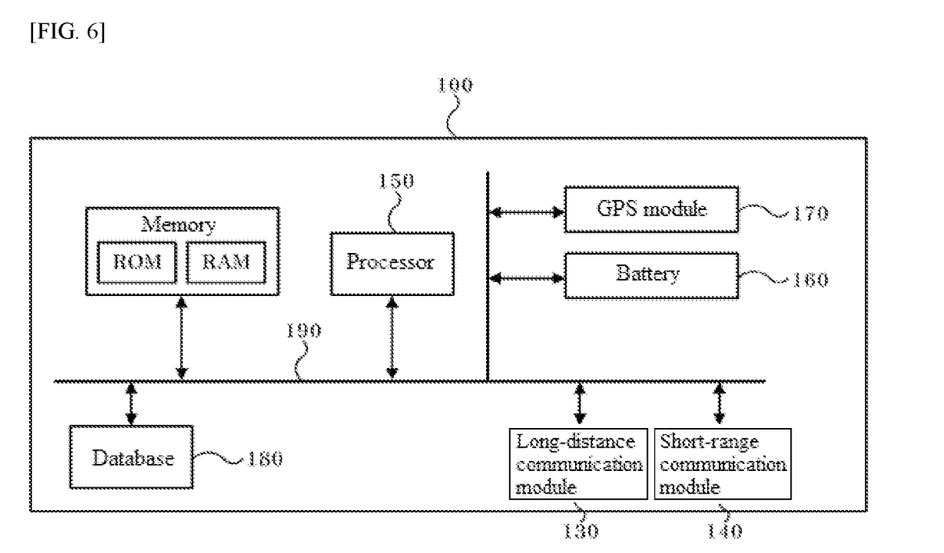
FIG. 6 illustrates components of a base unit in the kit according to FIG. 1 by way of example.

FIG. 6 illustrates configurations of the base unit 100 of the kit 10 according to FIG. 1 by way of example.

Referring to FIG. 6, the kit 10 may include a long-distance communication module 130, a short-range communication module 140, at least one processor 150, a battery 160, a GPS module 170 and a database 180.

The kit 10 may include a memory for storing instructions that instruct the at least one processor 150 to perform at least one operation.

The at least one operation may include components 101 to 103 of the kit 10 described later or other functions or operation methods.

At this time, the at least one processor 150 may mean a central processing unit (CPU), a graphics processing unit (GPU), or a dedicated processor for performing methods according to embodiments of the present invention. Each of the memory and database 180 may consist of at least one of a volatile storage medium and a non-volatile storage medium.

For example, the memory may be one of read only memory (ROM) and random-access memory (RAM), and the database 180 may be a flash-memory, a hard disk drive (HDD), solid state drive (SSD), or various memory cards (e.g., micro SD card).

The GPS module 170 may be configured to determine a user's location using signals transmitted from GPS satellites.

Further, the short-range communication module 140 may be configured to transmit a radio signal in a preset frequency range within a preset distance.

Further, the long-distance communication module 130 may be configured to perform communication through a wireless network. Further, the kit 10 may further include an input interface device (not shown), an output interface device (not shown), and the like. Each component included in the kit 10 may be connected by a bus 190 to communicate with each other.

Figure 7:
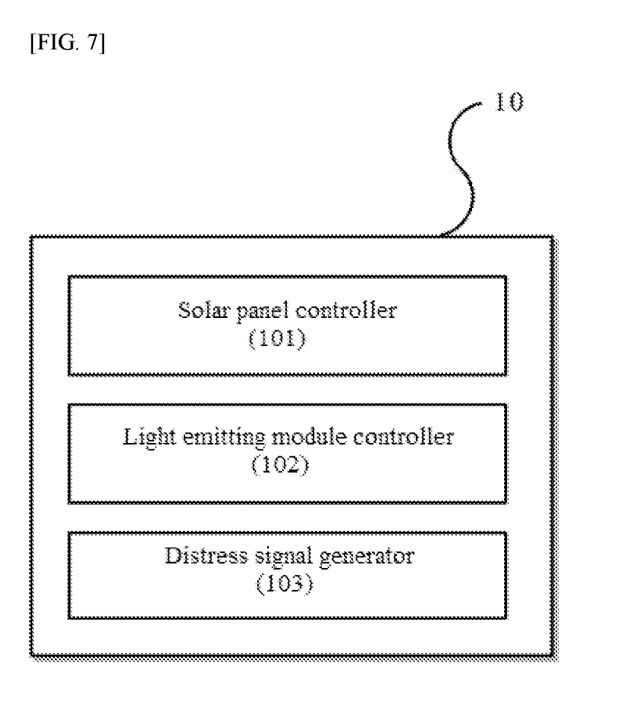
FIG. 7 is a block diagram showing functional modules of the kit according to FIG. 1 by way of example.

FIG. 7 is a block diagram showing functional modules of the kit 10 according to FIG. 1 by way of example.

The kit 10 may include a solar panel controller 101, a light emitting module controller 102, and a distress signal generator 103.

The solar panel controller 101 may control a process that generates electrical energy using light energy received by the first solar panel 212 and the second solar panel 222, and then stores the generated electrical energy in the battery 160.

Figure 8:
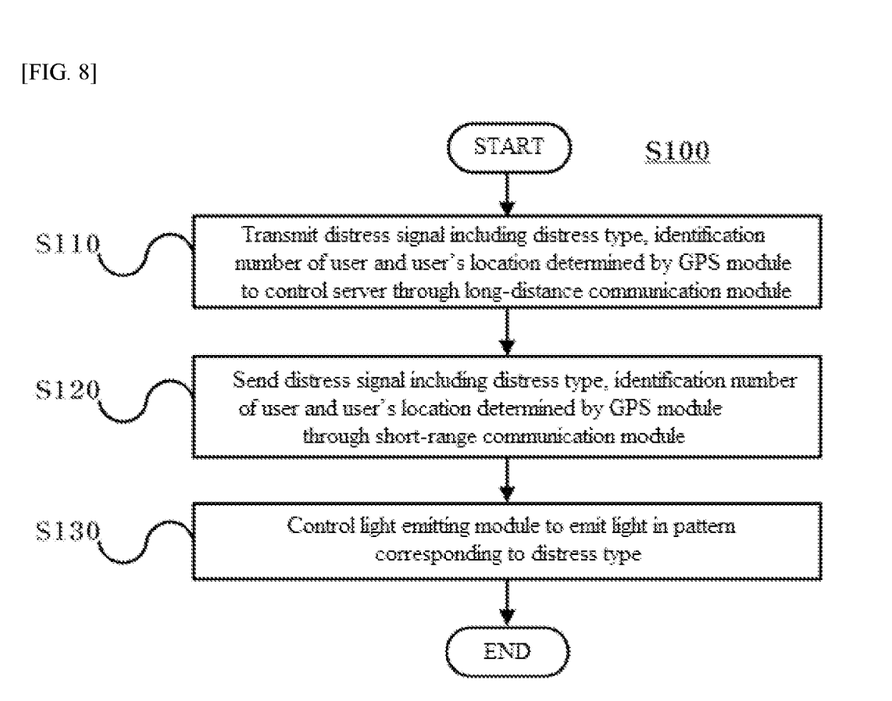
FIG. 8 is a flowchart illustrating a process of generating a distress signal by the kit according to FIG. 1.

FIG. 8 is a flowchart illustrating a process of generating a distress signal by the kit 10 according to FIG. 1.

The distress signal generator 103 transmits the distress signal including the distress type, the user's identification number and the user's location determined by the GPS module to the control server 20 through the long-distance communication module 130 (S110).

The user's identification number may be stored in the database 180 of the kit 10.

The distress signal generator 103 may receive a distress type through an input interface device (not shown) of the kit 10. In one embodiment, wounds, emergency injury, isolation, etc. may be set as the distress type, and the user may input a selection signal corresponding to any one of wounds, emergency injury, and isolation through an input interface device (Midos).

In one embodiment, the distress signal generator 103 may transmit a distress signal including the user's identification number and the user's location determined by the GPS module to the control server 20 through the long-distance communication module 130. In one embodiment, when the kit 10 is operated in the second state, the distress signal generator 103 may transmit the distress signal to the control server 20 through the long-distance communication module 130.

The control server 20 may identify the user's identity using the user's identification number and determine the user's location. Further, appropriate rescue measures corresponding to the type of distress may be performed for the user. For example, when the distress type is an emergency injury, a procedure may be performed to secure the user's identity as quickly as possible and transport the user to a medical institution.

The distress signal generator 103 may send a distress signal including the type of distress, the identification number of the user, and the location of the user determined by the GPS module 170 through the short-range communication module (S120).

The user's identification number may be stored in the database 180 of the kit 10.

The distress signal generator 103 may receive a distress type through an input interface device (not shown) of the kit 10. In one embodiment, wounds, emergency injury, isolation, etc. may be set as the distress type, and the user may input a selection signal corresponding to any one of wounds, emergency injury, and isolation through an input interface device (Midos).

In one embodiment, the distress signal generator 103 may send a distress signal including the user's identification number and the user's location determined by the GPS module through the short-range communication module 140. Hence, the distress signal can be transmitted to another user's kit 10 located in the communication range of the short-range communication module. That is, even if transmission of the distress signal through the long-distance communication module 130 fails, when another user is located within the communication range of the short-distance communication module 140, the distress signal can be transmitted to the kit 10 of another user.

In one embodiment, when the kit 10 is operated in the second state, the distress signal generator 103 may send a distress signal through the short-range communication module 140.

The light emitting module controller 102 may control the first light emitting module 213 and the second light emitting module 223 to emit light in a pattern corresponding to the distress type (S130).

In the database 180 of the kit 10, each of a plurality of preset light emission patterns and each of a plurality of distress types are pre-matched and stored. The light emitting module controller 102 selects a light emission pattern corresponding to the distress type received from the database 180, and controls the first light emitting module 213 and the second light emitting module 223 to emit light according to the selected light emission pattern.

Figure 9:
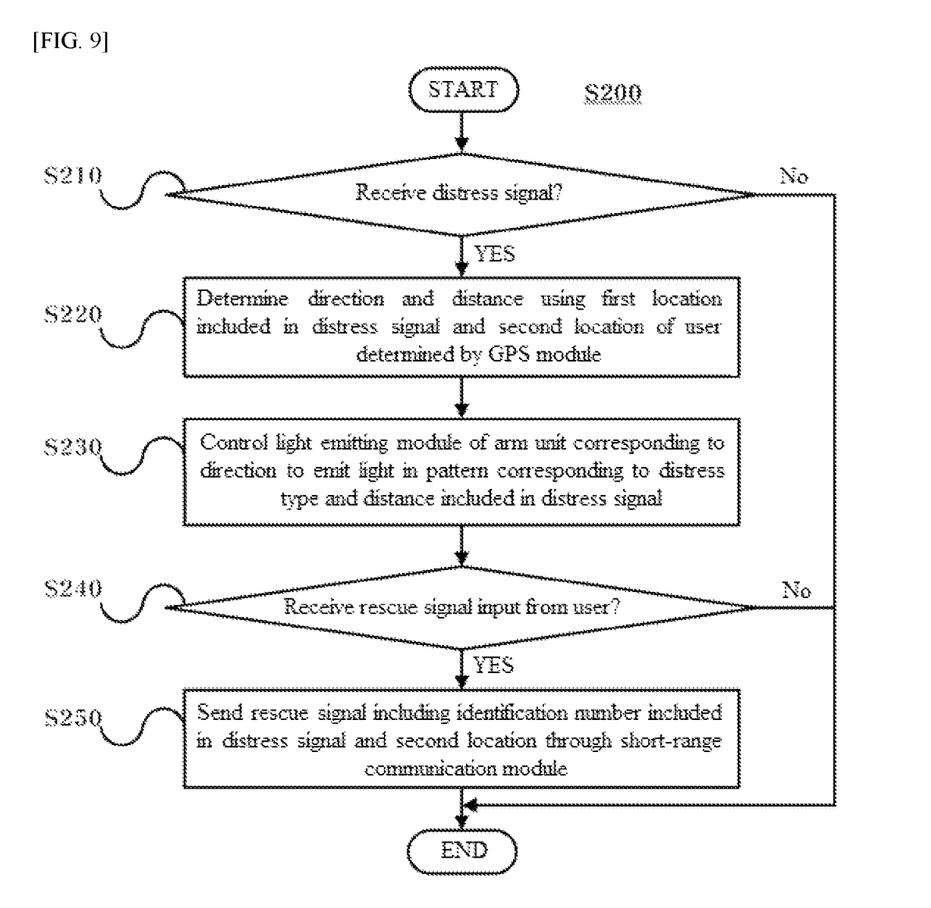
FIG. 9 is a flowchart illustrating a process of generating a rescue signal by the kit according to FIG. 1.

FIG. 9 is a flowchart illustrating a process that generates a distress signal by the kit 10 according to FIG. 1.

When a distress signal is received from another user's kit 10, the distress signal generator 103 in the kit 10 may send a rescue signal.

First, when the distress signal is received (S210), the distress signal generator 103 determines the direction and distance using a first location of a person in need of rescue included in the distress signal and a second location of the user determined by the GPS module 170 (S220).

For example, if a second location is 600 m northwest apart from a first location, southeast is determined as the direction and 600 m is determined as the distance. The direction is determined from the second position toward the first position.

In one embodiment, each of the plurality of preset directions may correspond to each of the arm units 200. When the number of arm units 200 is six, orientations divided into six (6) directions may be used, and a direction closest to an angle formed by the second position and the first position may be selected. For example, when it is assumed that north is 90°, 0°, 60°, 120°, 180°, 240° and 300° may be determined as directions corresponding to the six arm units 200. When the angle formed by the second position and the first position is 190°, a direction corresponding to 180° may be selected. A direction indicator may be formed on at least two of the arm units 200, and an azimuth meter (not shown) may be included in the kit 10. Hence, the user can arrange the kit 10 such that the arm units 200, on which the direction indicators are formed among all of the arm units 200, correspond to the azimuth meter.

The light emitting module controller 102 controls the first light emitting module 213 and the second light emitting module 223 of the arm unit 200 corresponding to the direction to emit light in a pattern corresponding to the distress type and distance included in the distress signal (S230).

The light emitting module controller 102 selects the arm unit 200 corresponding to the direction among all of the arm units 200.

In the database 180 of the kit 10, a plurality of preset light emission patterns and a plurality of distress types, respectively, may be pre-matched and stored. The light emitting module controller 102 selects a light emission pattern corresponding to the type of distress received from the database 180, and then controls the first light emitting module 213 and the second light emitting module 223 of the arm unit 200 corresponding to the direction to emit light according to the selected light emission pattern.

The first light emitting module 213 and the second light emitting module 223 may include a plurality of LED modules, and the light emitting module controller 102 may control the LED modules corresponding to the distance to emit light in a light emission pattern corresponding to the distress type.

The plurality of distance ranges and the number of LED modules are matched, respectively, and stored in the database 180 of the kit 10 in advance, and the light emitting module controller 102 may select the number of LED modules matching with the distance, and then control the selected number of LED modules to emit light in a light emission pattern corresponding to the distress type.

In one embodiment, the light emitting module controller 102 may select the number of LED modules matching with the distance in the order of proximity to the base plate 110, and then control the selected LED modules to emit light in a light emission pattern corresponding to the distress type.

Hence, the user receiving the distress signal (or referred to as "rescuer") can grasp a distress type of a person in need of rescue ("distressed person"), a direction to be moved to reach the distressed person, and a distance to reach the distressed person.

The light emitting module controller 102 may send a rescue signal including an identification number included in the distress signal and a second location through the short-range communication module (S250).

Figure 10:
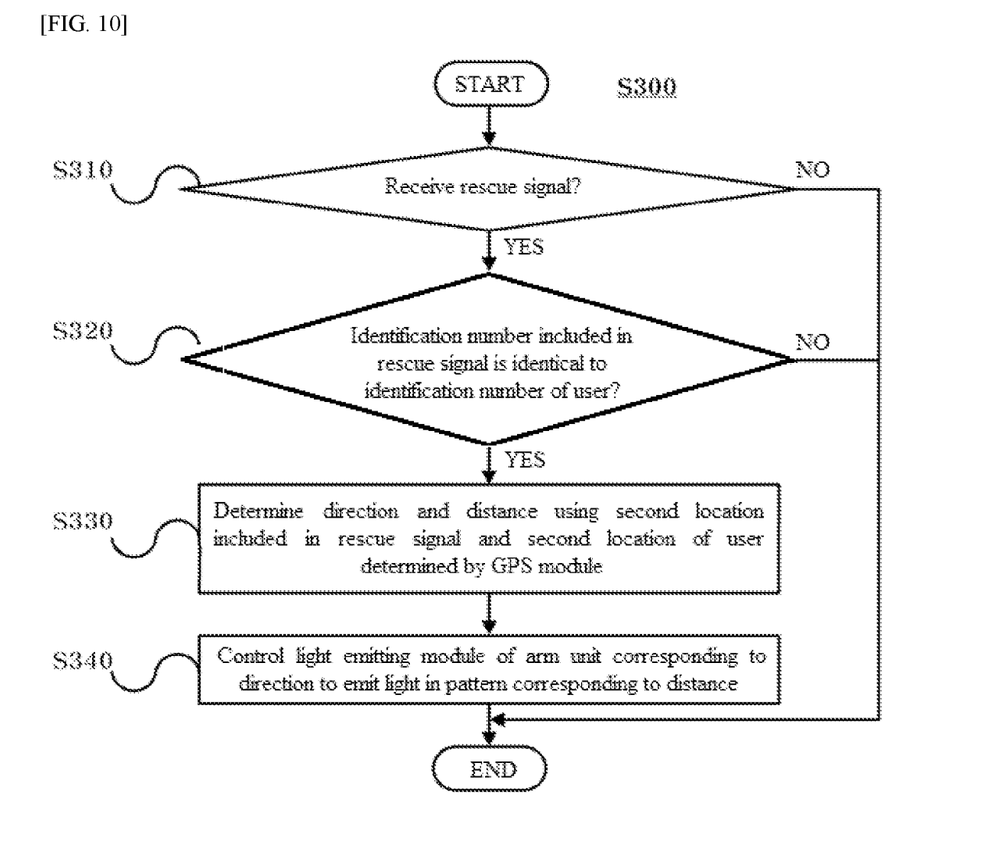
FIG. 10 is a flowchart illustrating a process in which the kit according to FIG. 1 receives a rescue signal.

FIG. 10 is a flowchart illustrating a process of receiving a rescue signal by the kit 10 according to FIG. 1.

When the rescue signal is received from another user's kit 10 (S310), the distress signal generator 103 determines whether the identification number included in the rescue signal is the same as the identification number of the distressed person (S320).

If the identification numbers are the same, the distress signal generator 103 determines the direction and distance using the second location of the rescuer in the rescue signal and the first location of the distressed person (S320).

For example, if the second location is 600 m northwest apart from the first location, northwest is determined as the direction and 600 m is determined as the distance. The direction is determined to be directed from the first location towards the second location.

In one embodiment, each of the plurality of preset directions may correspond to each of the arm units 200. When the number of arm units 200 is six, orientations divided into six (6) directions may be used, and a direction closest to an angle formed by the second position and the first position may be selected. For example, when it is assumed that north is 90°, 0°, 60°, 120°, 180°, 240° and 300° may be determined as directions corresponding to the six arm units 200. When the angle formed by the second position and the first position is 190°, a direction corresponding to 180° may be selected. A direction indicator may be formed on at least two of the arm parts 200, and an azimuth meter (not shown) may be included in the kit 10. Hence, the user can arrange the kit 10 such that the arm units 200, on which the direction indicators are formed among all of the arm units 200, correspond to the azimuth meter.

The light emitting module controller 102 may control the first light emitting module 213 and the second light emitting module 223 of the arm unit 200 corresponding to the direction to emit light in a pattern corresponding to the distance (S340).

The light emitting module controller 102 selects the arm unit 200 corresponding to the direction among all of the arm units 200.

The first light emitting module 213 and the second light emitting module 223 may include a plurality of LED modules, while the light emitting module controller 102 may control the LED modules corresponding to the distance to emit light.

A plurality of distance ranges and the number of LED modules are matched, respectively, and stored in the database 180 of the kit 10 in advance, and the light emitting module controller 102 may select the number of LED modules matching with the distance and then control the selected number of LED modules to emit light.

In one embodiment, the light emitting module controller 102 may select the number of LED modules matching with the distance in the order of proximity to the base plate 110 and then control the selected LED modules to emit light.

Therefore, the distressed person receiving the rescue signal can grasp the information that the rescuer is coming for rescue, as well as a direction of the rescuer approaching the distressed person and a distance between the rescuer and the distress person, and the like.

The methods according to the present invention may be implemented in the form of program instructions that can be executed by various computer means, and then, recorded on a computer readable medium. Computer readable media may include program instructions, data files, data structures, etc. alone or in combination. Program instructions recorded on a computer readable medium may be specially designed and configured for the present invention, or may be known and usable to those skilled in computer software.

Examples of the computer readable media may include hardware devices specially configured to store and execute program instructions, such as ROM, RAM, flash memory, and the like. Examples of the program instructions may include not only machine language codes generated by a compiler but also high-level language codes that can be executed by a computer using an interpreter and the like. The hardware device described above may be configured to operate with at least one software module in order to perform the operations of the present invention, and vice versa.

In addition, the above-described method or device may be implemented by combining all or some of components or functions thereof, or may be implemented separately.

Although the above description has been provided with reference to preferred embodiments of the present invention, it would be appreciated that those skilled in the art will variously modify and change the present invention within the range not departing from the spirit and scope of the present invention described in the appended claims below.

The invention claimed is:

1. A kit for generating a distress signal based on solar energy, the kit comprising:
a base unit that includes a base plate, a long-distance communication module coupled to one side of the base plate, a GPS module, at least one processor and a battery; and
a plurality of arm units that are spaced from one another and arranged around the periphery of the base plate, and are connected to the base plate through a first hinge;
wherein each arm unit includes:
a first arm plate that is connected to the base plate at one end thereof through the first hinge, and can rotate around a folded portion of the first hinge as a rotation axis in a clockwise or counter-clockwise direction;
a first solar module and a first light emitting module, which are attached to one side of the first arm plate facing the rotation direction in a clockwise direction;
a second arm plate that is connected to the other end opposite to the one end of the first arm plate through a second hinge, and can rotate around a folded portion of the second hinge as a rotation axis in a clockwise or counter-clockwise direction; and
a second solar module and a second light emitting module, which are attached to one side of the second arm plate facing the rotation direction in a counter-clockwise direction;
wherein the at least one processor controls the first solar module and the second solar module to generate electric energy using the received light energy, and then to store the generated electric energy in the battery, and also controls the first light emitting module and the second light emitting module to emit light using the electric energy stored in the battery;
wherein, if the kit is in a first state, a distress signal is sent by controlling the long-distance communication module;
wherein the first hinge is configured to be folded or unfolded between a first preset maximum angle and a first preset minimum angle; and
the second hinge is configured to be folded or unfolded between a second present maximum angle and a second present minimum angle;
wherein the first state is a state in which:
the first hinge is unfolded at the first maximum angle and thus the first arm plate extends in a radial direction of the base plate; and
the second hinge is unfolded at an angle between the second maximum angle and the second minimum angle and thus the second arm plate rotates in a counter-clockwise direction to a folded portion of the second hinge as a rotation axis;
wherein, when the distress signal is received from another kit of a person in need of rescue, which is different from the kit, the at least one processor determines a direction and a distance using a first location of the person included in the distress signal and a second location determined by the GPS module; and
the at least one processor controls the first light emitting module and the second light emitting module included in an arm unit corresponding to the above direction among all of the arm units to emit light in a pattern corresponding to distress type included in the distress signal and the above distance.

2. The kit according to claim 1, wherein the kit is switched to a second state as the first hinge and the second hinge are folded;
wherein the second state is a state in which:
the second hinge is folded at the second minimum angle and thus the other side opposite to the one side of the first arm plate and the other side opposite to the one side of the second arm plate are faced in contact with each other; and
the first hinge is folded at the first minimum angle and thus the arm units are extending in a direction away from the one side of the base plate.

3. The kit according to claim 1, wherein at least one ring is provided to protrude at the other side opposite to the one side of the base plate.

* * * * *